Patented Dec. 3, 1929

1,737,916

UNITED STATES PATENT OFFICE

OSCAR A. CHERRY AND FRANZ KURATH, OF CHICAGO, ILLINOIS, ASSIGNORS TO ECONOMY FUSE AND MANUFACTURING COMPANY, OF CHICAGO, ILLINOIS, A CORPORATION OF NEW YORK

PHENOLIC CONDENSATION PRODUCTS AND METHOD OF PRODUCING SAME

No Drawing.   Application filed February 19, 1926.   Serial No. 89,487.

The present invention relates to improvements in methods for producing phenolic condensation products.

It has long been recognized that for the production of molded products possessing the highest degree of strength, hardness and resistivity (either chemical or electrical) it is necessary to carry out the final condensation between the phenolic body and the methylene hardening agent in the presence of a basic condensing agent. As is well known, the reaction leading to the formation of a potentially reactive resin may be carried out by what is known in the art as the one step process or the two step process. The one step reaction in the presence of a basic condensing agent is difficult to control and frequently results in rubbery, worthless products instead of the fusible, soluble products desired. By the two step reaction it is possible to prepare fusible products by carrying out the reaction in the absence of a condensing agent. To these fusible products a methylene hardening agent and a basic condensing agent may be added. Said methylene hardening agent may have the form of an aqueous solution, or the form of an anhydrous polymer or compound. Among the basic condensing agents known to be suitable are sodium hydroxide, sodium sulphite, and ammonia. Instead of ammonia, a compound of formaldehyde and ammonia, such as hexamethylenetetramine, may be used.

An object of the present invention is to provide an improvement in the process outlined above which improved process will require less skill than has heretofore been necessary.

A further object is to provide an improved process which will result in a product having greater electrical resistivity than heretofore.

A further object is to provide a process which will not evolve volatile matters.

A further object is to provide a product having greater electrical resistivity than has heretofore been provided and which will simplify the matter of molding.

Further objects will appear as the description proceeds.

The present invention in its fundamental aspects contemplates the use of a special condensing agent which, though a neutral compound, acts as a base under the conditions of the reactions and by reason of which many of the difficulties of the process of making the heat induratable composition may be avoided and the properties of the composition materially improved. The particular condensing agent which is at present preferred is furfuramide, which substance is the reaction product of furfural and ammonia. Furfuramide, which has the chemical symbol of $(C_5H_4O)_3N_2$, has the structure

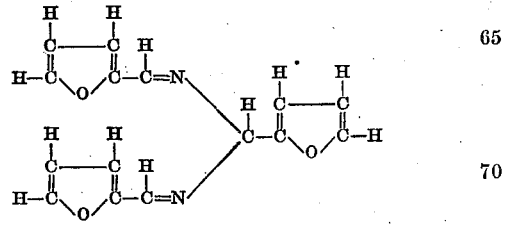

Furfuramide is an electrical insulator and is water insoluble, but is soluble in both the potentially reactive resin and in the final product, and is non-volatile. For these reasons the quantity thereof that may be used without impairing the electrical properties is practically unlimited. Furthermore, furfuramide serves as a desirable plasticizing agent, whereby the matter of molding is simplified.

Though furfuramide has been stated to be the substance at present preferred, it will at once occur to those skilled in the art that hydrobenzamide has possibilities as a suitable substitute for furfuramide. As is well known in the art, though furfuramide and hydrobenzamide have different chemical structures, they are equivalents as chemical agents in a great variety of chemical reactions. In the claims which form a part of this specification, when the term "furfuramide" is used, said term is to be construed to include the equivalents thereof, particular reference being had to hydrobenzamide.

When ammonia is used as a condensing agent, there is frequently a tendency for molded articles to blister when removed from the mold, or to blister when the molded articles are subsequently heated to a higher temperature. Moreover, if an excess of hexamethylenetetramine is used, the final product is weakened by reason of such excess. Articles made by the use of furfuramide as a condensing agent are free from these defects. Very large quantities of furfuramide may be used without deleterious effects. Fixed bases previously proposed, such as caustic soda are electrical conductors, and the use of large quantities thereof, impairs the electrical resistance of the final product. Furfuramide is free from this objection.

Furfuramide, or its equivalent, hydrobenzamide, may be employed as a condensing agent with either the one step or the two step process, as will now be explained.

A suitable method of using furfuramide in the one step reaction is as follows, it being understood that the proportions referred to are merely illustrative and are not to be considered in a limiting sense: 100 parts of a phenolic body such as phenol and 100 parts of commercial formaldehyde solution are boiled under a reflux condenser in the presence of 20 parts of furfuramide until the mixture separates into two layers, and a slight thickening has occurred. The mixture may then be concentrated by distillation, preferably under reduced pressure, until substantially anhydrous; or, preferably, the supernatant liquid may be treated with an added quantity of furfuramide and the resultant water decanted, which preferable method is not claimed herein.

A potentially reactive resin is thus obtained which may be hardened by heating at low temperatures without the application of pressure, or which may be mixed with fillers by known methods and formed into hard, infusible, compact, resistant articles by the combined action of heat and pressure. As noted above, a larger quantity of furfuramide than that stated above may be used, if desired, without deleterious effects, or an additional quantity of furfuramide may be added at the time the potentially reactive resin is mixed with the filler. The addition of furfuramide serves to accelerate the final hardening and also exerts a desired plasticizing action during the molding operation without impairing the heat resistance of the final product.

When it is desired to form a potentially reactive product by a two step reaction, a fusible resin is made by any known method, for example, by heating a phenolic body and formaldehyde under pressure in the absence of a condensing agent. To this permanently fusible resin is added a quantity of formaldehyde or polymer thereof sufficient to render the product infusible upon heating and a quantity of furfuramide which may be varied, for example, from twenty per cent to seventy-five per cent, or more, of the weight of the fusible resin. After admixture with a filling material, the product may be hardened by the combined action of heat and pressure, by known methods.

Whether the reaction is carried out by the one step or the two step reaction, it is essential that sufficient reactive methylene groups be present to combine with all of the phenolic body. If a deficiency of methylene containing substance is used, a portion of the furfuramide will combine with the phenolic body, engendering ammonia, which is undesirable in the final product. Moreover, when any of the furfuramide reacts with the phenolic body, a dark color is developed, but when a sufficient amount of formaldehyde is present, the final product is of a light color.

It will be clear that modifications may be made in the present invention without departing from the scope thereof. It is intended to cover all such modifications that fall within the scope of the appended claims.

It is to be understood that the term "phenolic substance" as found in the claims is to be construed to include either phenol alone, as introduced originally for the initial reaction as when reactive methylene groups are added to the phenol in the one-step process, or the resultant of the chemical reaction of phenol and a reactive methylene containing substance where phenol is present in excess of substantially equi-molecular proportions, leaving uncombined phenol to which additional reactive methylene groups are added, as in the case of a two-step process.

As set forth above, the present invention contemplates either a one-step or a two-step process. Also the potentially reactive product herein claimed contemplates a product embodying first the resultant of the chemical reaction between phenol and a methylene containing substance and free or uncombined reactive methylene groups, the resultant product having dissolved therein furfuramide. It is to be understood that this potentially reactive product may be formed by either a one-step or a two-step process covering the potentially reactive product as a substance irrespective of how it is produced. It is the applicant's intention to include as their invention this product, whether the phenol and reactive methylene containing substance react originally when heated in substantially equi-molecular proportions, or whether the phenol be in excess and additional reactive methylene groups are added to the resultant of the first reaction. The applicants, however, only intend to include as their invention potentially reactive products of the above described type, having dissolved therein furfuramide, whether introduced originally or later on in the process.

What is claimed is:—

1. The process which consists of heating a phenolic substance and a reactive methylene containing substance in the presence of furfuramide.

2. The process which consists of heating a phenolic substance and formaldehyde in the presence of furfuramide.

3. A potentially reactive product comprising a substance containing reactive methylene groups, furfuramide, and the resultant of the chemical reaction of a phenolic substance and formaldehyde which reaction has been permitted to continue until separation into two layers has occurred, which reaction has been stopped when slight thickening has occurred.

4. A potentially reactive product comprising a substance containing reactive methylene groups, furfuramide, and the resultant of the chemical reaction of substantially equal parts by weight of a phenolic substance and formaldehyde which reaction has been permitted to continue until separation into two layers has occurred, which reaction has been stopped when slight thickening has occurred.

5. The process of producing a potentially reactive resin which consists of heating a phenolic substance and a reactive methylene containing substance in the presence of furfuramide until separation into two layers has occurred, and stopping the reaction when slight thickening of the lower layer has occurred.

6. The process of producing a potentially reactive resin which consists of heating substantially equal parts by weight of a phenolic substance and a reactive methylene containing substance in the presence of furfuramide until separation into two layers has occurred, and stopping the reaction when slight thickening of the lower layer has occurred.

7. A potentially reactive phenolic condensation product comprising the resultant of the chemical reaction of substantially equal parts by weight of a phenolic substance and formaldehyde, said resultant product having furfuramide therein.

8. The process which consists of heating substantially equal parts by weight of a phenolic substance and formaldehyde in the presence of furfuramide until a potentially reactive resin is formed.

9. A potentially reactive product comprising a substance containing reactive methylene groups, furfuramide, and the resultant chemical recation of a phenolic substance and formaldehyde.

10. A potentially reactive product comprising a substance containing reactive methylene groups, furfuramide, and the resultant of the chemical reaction of a phenolic substance and a reactive methylene containing substance.

Signed at Chicago, Illinois, this 8th day of February, 1926.

OSCAR A. CHERRY.
FRANZ KURATH.